US009691142B2

(12) United States Patent
Shigemura (10) Patent No.: US 9,691,142 B2
(45) Date of Patent: Jun. 27, 2017

(54) IMAGE GENERATING DEVICE, IMAGE GENERATING METHOD, AND NON-TRANSITORY COMPUTER-READABLE STORAGE MEDIUM

(71) Applicant: DENSO CORPORATION, Kariya, Aichi-pref. (JP)

(72) Inventor: Shusaku Shigemura, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/902,938

(22) PCT Filed: Jun. 23, 2014

(86) PCT No.: PCT/JP2014/003347
§ 371 (c)(1),
(2) Date: Jan. 5, 2016

(87) PCT Pub. No.: WO2015/004866
PCT Pub. Date: Jan. 15, 2015

(65) Prior Publication Data
US 2016/0155219 A1    Jun. 2, 2016

(30) Foreign Application Priority Data

Jul. 8, 2013 (JP) ................. 2013-142726

(51) Int. Cl.
*G06K 9/36* (2006.01)
*G06T 5/50* (2006.01)
(Continued)

(52) U.S. Cl.
CPC ............... *G06T 5/50* (2013.01); *B60R 1/00* (2013.01); *B60R 11/04* (2013.01); *G06T 3/4038* (2013.01);
(Continued)

(58) Field of Classification Search
CPC ....... G06T 5/50; G06T 7/0022; G06T 7/0065; G06T 3/4038; G06T 5/006; G06T 5/40;
(Continued)

(56) References Cited

U.S. PATENT DOCUMENTS 5,982,951 A    11/1999 Katayama et al.
7,277,118 B2 *  10/2007 Foote .................... G06T 3/4038
                                                  348/218.1
(Continued)

FOREIGN PATENT DOCUMENTS

| JP | 2011-110247 A | 6/2011 |
|---|---|---|
| JP | 4982127 B | 7/2012 |
| WO | 2015/004866 A1 | 1/2015 |

OTHER PUBLICATIONS

ISR and Written Opinion of PCT/JP2014/003347 Mailed on Sep. 2, 2014.

*Primary Examiner* — Jose Couso
(74) *Attorney, Agent, or Firm* — Knobbe, Martens, Olson & Bear, LLP (57) ABSTRACT

An image generating device that generates a composite image based on partial images cut out from captured images having photographic subject regions partially overlapping with each other, includes: a correction device that corrects each target partial image by setting one of first and second adjacent partial images as a reference partial image; a generation device that generates first and second conversion tables for approximating a concentration characteristic of each target partial image in overlapping first and second common regions to the first and second adjacent partial images, respectively; and a mixture conversion device that converts a concentration of each target partial image to make an influence of the first conversion table larger as a position of a pixel is closer to the first adjacent partial image, and to make the influence of the second conversion table larger as (Continued)

the position of the pixel is closer to the second adjacent partial image.

7 Claims, 7 Drawing Sheets

(51) Int. Cl.
| | |
|---|---|
| *B60R 1/00* | (2006.01) |
| *G06T 3/40* | (2006.01) |
| *B60R 11/04* | (2006.01) |
| *G06T 5/00* | (2006.01) |
| *G06T 5/40* | (2006.01) |
| *G06T 11/60* | (2006.01) |
| *H04N 5/247* | (2006.01) |
| *H04N 7/18* | (2006.01) |

(52) U.S. Cl.
CPC ............... *G06T 5/006* (2013.01); *G06T 5/40* (2013.01); *G06T 11/60* (2013.01); *H04N 5/247* (2013.01); *B60R 2300/303* (2013.01); *B60R 2300/607* (2013.01); *G06T 2207/30252* (2013.01); *H04N 7/18* (2013.01)

(58) Field of Classification Search
CPC ... G06T 11/60; G06T 5/00; G06T 5/20; G06T 5/008; G06T 2207/30241; G06T 2207/00; G06T 2207/10021; G06T 2207/20172–2207/20208; G06T 2207/20212–2207/20221; G06T 2207/30248–2207/30264; H04N 1/32502; H04N 1/32507; H04N 5/247; H04N 5/3415; H04N 7/181; H04N 21/21805; H04N 1/3876; H04N 5/23238; H04N 1/407; H04N 1/4072; H04N 1/4074; H04N 1/6027; G06K 9/40; G06K 9/44; G06K 9/00791–9/00825; B60R 1/00; B60R 11/04; B60R 2001/1253; B60R 2300/105; B60R 2300/108; B60R 2300/303; G05D 1/0246; G03B 19/023
See application file for complete search history.

(56) References Cited

U.S. PATENT DOCUMENTS

| | | | | |
|---|---|---|---|---|
| 7,352,398 | B2* | 4/2008 | Sano | H04N 5/235 |
| | | | | 348/222.1 |
| 7,352,887 | B2* | 4/2008 | Besson | G06T 5/008 |
| | | | | 378/7 |
| 9,135,688 | B2* | 9/2015 | Seo | G06T 5/008 |
| 9,426,365 | B2* | 8/2016 | Laroia | G02B 27/646 |
| 2004/0004666 | A1 | 1/2004 | Sano | |
| 2013/0094705 | A1* | 4/2013 | Tyagi | G06K 9/00369 |
| | | | | 382/103 |

* cited by examiner

IMAGE GENERATING DEVICE, IMAGE GENERATING METHOD, AND NON-TRANSITORY COMPUTER-READABLE STORAGE MEDIUM

CROSS REFERENCE TO RELATED APPLICATION

This disclosure is based on Japanese Patent Application No. 2013-142726 filed on Jul. 8, 2013, the disclosure of which is incorporated herein by reference.

TECHNICAL FIELD

The present disclosure relates to an image generating device and an image generating method for generating a composite image with the use of multiple captured images, and a non-transitory computer readable storage medium therefor.

BACKGROUND ART

A technique has been known in which an image encompassing a wide subject region beyond an imaging area captured by one camera is generated by combining multiple captured images together. For example, Patent Literature 1 discloses a technique that performs a correction for allowing a concentration characteristic of one image B to approximate a concentration characteristic of the other image A on the basis of the respective concentration characteristics of the images A and B in an overlapping portion of the images A and B adjacent to each other.

Specifically, according to the disclosure of Patent Literature 1, an overlapping portion of the image A with the image B is cut out as a composite part a, and an overlapping portion of the image B with the image A is cut out as a composite part b. Then, histograms Ha(x) and Hb(x) of the respective composite parts a and b are generated from pixel values of the composite parts a and b. Then, gradation conversion tables LUTa and LUTb that can execute histogram equalization (histogram equalization) are generated for the respective histograms Ha(x) and Hb(x). Then, gradation conversion is executed on an overall area of the image B with the use of the gradation conversion table LUTb, and reverse gradation conversion is executed on the image subjected to the gradation conversion with the use of the gradation conversion table LUTa. In other words, a gradation conversion process for allowing the histogram Hb(x) of the composite part b to approximate the histogram Ha(x) of the composite part a is subjected to the overall area of the image B.

The technique disclosed in Patent Literature 1 described above is applied to a composite image in which multiple images are continuously arranged in a strip (in a predetermined direction). Therefore, if one of the multiple captured images is used as a reference, and the other captured images are corrected in turn, deviations in the concentration characteristic between the respective adjacent images can be suppressed in all of the boundary portions (portions where the respective images are adjacent to each other) of the composite image.

On the other hand, as the composite image, there is also a composite image in which multiple images are continuously arranged in an annular shape, for example, like an image (so-called top view image) of surroundings of the vehicle viewed from a top. In this case, the technique disclosed in Patent Literature 1 suffers from such a problem that the deviations in the concentration characteristic between the respective adjacent images cannot be suppressed in one or more boundary portions of the composite image.

In other words, for example, when four images A, B, C, and D are continuously arranged in a stripe, the image B may be corrected on the basis of the image A, the image C may be corrected on the basis of the corrected image B, and the image D may be corrected on the basis of the corrected image C.

On the contrary, when the four images A, B, C, and D are continuously arranged in an annular shape, the deviation in the concentration characteristic occurs in a boundary portion where the image A is adjacent to the corrected image D by merely correcting the images B, C, and D in order as with a case of the stripe. If the image A is corrected on the basis of the corrected image D, the deviation in the concentration characteristic between the image A and the image D is suppressed. However, because the deviation in the concentration characteristic between the corrected image A and the image B occurs instead, the above problem is not eliminated. The above problem is not limited to the image of the surroundings of the vehicle viewed from the top, but may arise in a composite image in which the multiple images are continuously arranged in the annular shape.

PRIOR ART LITERATURES

Patent Literature

Patent Literature 1: JP-2011-110247 A

SUMMARY OF INVENTION

It is an object of the present disclosure to provide an image generating device and an image generating method which suppress a deviation in concentration characteristic in all of boundary portions in a composite image in which multiple images are continuously arranged in an annular shape stripe, and a non-transitory computer readable storage medium therefor.

According to a first aspect of the present disclosure, an image generating device that generates a composite image, in which a plurality of partial images respectively cut out from a plurality of captured images are continuously arranged in an annular shape, using the plurality of captured images respectively having photographic subject regions partially overlapping with each other, includes: a correction device that corrects each target partial image by setting at least one of a first adjacent partial image and a second adjacent partial image, which are the partial images adjacent to the target partial image on both sides in the composite image, as a reference partial image, when at least one of the plurality of partial images is defined as a reference partial image, and the partial images other than the reference partial image are defined as target partial images; a generation device that generates a first conversion table as a concentration conversion table for performing a correction to approximate a concentration characteristic of each target partial image to a concentration characteristic of the first adjacent partial image and a second conversion table as a concentration conversion table for performing a correction to approximate the concentration characteristic of each target partial image to a concentration characteristic of the second adjacent partial image; and a mixture conversion device that converts a concentration of each target partial image using each of the first conversion table and the second conversion table. The generation device generates the concentration conversion table as the first conversion table for performing the correction to approximate a concentration characteristic of each target captured image in a first common region to a concentration characteristic of a first adjacent captured image in the first common region when a photographic subject region of the target captured image, which is a captured image providing an origin of the target partial image, and a photographic subject region of the first adjacent captured image, which is a captured image providing an origin of the first adjacent partial image, are overlapped in the first common region. The generation device generates the concentration conversion table as the second conversion table for performing the correction to approximate a concentration characteristic of each target captured image in a second common region to a concentration characteristic of a second adjacent captured image in the second common region when the photographic subject region of the target captured image and a photographic subject region of the second adjacent captured image, which is a captured image providing an origin of the second adjacent partial image, are overlapped in the second common region. The mixture conversion device converts the concentration of the target partial image to make an influence of the first conversion table larger as compared with an influence of the second conversion table as a position of a pixel in the target partial image is closer to the first adjacent partial image, and to make the influence of the second conversion table larger as compared with the influence of the first conversion table as the position of the pixel in the target partial image is closer to the second adjacent partial image.

In the above device, a deviation in the concentration characteristic can be suppressed in all of the boundary portions in the composite image in which the multiple partial images are continuously arranged in the annular shape.

According to a second aspect of the present disclosure, an image generating method used in an image generating device that generates a composite image, in which a plurality of partial images respectively cut out from a plurality of captured images are continuously arranged in an annular shape, using the plurality of captured images respectively having photographic subject regions partially overlapping with each other, includes: a correction step for correcting each target partial image by setting at least one of a first adjacent partial image and a second adjacent partial image, which are the partial images adjacent to the target partial image on both sides in the composite image, as a reference partial image, when at least one of the plurality of partial images is defined as a reference partial image, and the partial images other than the reference partial image are defined as target partial images; a generation step for generating a first conversion table as a concentration conversion table for performing a correction to approximate a concentration characteristic of each target partial image to a concentration characteristic of the first adjacent partial image and a second conversion table as a concentration conversion table for performing a correction to approximate the concentration characteristic of each target partial image to a concentration characteristic of the second adjacent partial image; and a mixture conversion step for converting a concentration of each target partial image using each of the first conversion table and the second conversion table. The generation step provides to generate the concentration conversion table as the first conversion table for performing the correction to approximate a concentration characteristic of each target captured image in a first common region to a concentration characteristic of a first adjacent captured image in the first common region when a photographic subject region of the target captured image, which is a captured image providing an origin of the target partial image, and a photographic subject region of the first adjacent captured image, which is a captured image providing an origin of the first adjacent partial image, are overlapped in the first common region. The generation step provides to generate the concentration conversion table as the second conversion table for performing the correction to approximate a concentration characteristic of each target captured image in a second common region to a concentration characteristic of a second adjacent captured image in the second common region when the photographic subject region of the target captured image and a photographic subject region of the second adjacent captured image, which is a captured image providing an origin of the second adjacent partial image, are overlapped in the second common region. The mixture conversion step provides to convert the concentration of the target partial image to make an influence of the first conversion table larger as compared with an influence of the second conversion table as a position of a pixel in the target partial image is closer to the first adjacent partial image, and to make the influence of the second conversion table larger as compared with the influence of the first conversion table as the position of the pixel in the target partial image is closer to the second adjacent partial image.

In the above method, a deviation in the concentration characteristic can be suppressed in all of the boundary portions in the composite image in which the multiple partial images are continuously arranged in the annular shape.

According to a third aspect of the present disclosure, a non-transitory computer readable storage medium includes instructions for functioning a computer as an image generating device that generates a composite image, in which a plurality of partial images respectively cut out from a plurality of captured images are continuously arranged in an annular shape, using the plurality of captured images respectively having photographic subject regions partially overlapping with each other, and the instruction includes: a correction step for correcting each target partial image by setting at least one of a first adjacent partial image and a second adjacent partial image, which are the partial images adjacent to the target partial image on both sides in the composite image, as a reference partial image, when at least one of the plurality of partial images is defined as a reference partial image, and the partial images other than the reference partial image are defined as target partial images; a generation step for generating a first conversion table as a concentration conversion table for performing a correction to approximate a concentration characteristic of each target partial image to a concentration characteristic of the first adjacent partial image and a second conversion table as a concentration conversion table for performing a correction to approximate the concentration characteristic of each target partial image to a concentration characteristic of the second adjacent partial image; and a mixture conversion step for converting a concentration of each target partial image using each of the first conversion table and the second conversion table. The generation step provides to generate the concentration conversion table as the first conversion table for performing the correction to approximate a concentration characteristic of each target captured image in a first common region to a concentration characteristic of a first adjacent captured image in the first common region when a photographic subject region of the target captured image, which is a captured image providing an origin of the target partial image, and a photographic subject region of the first adjacent captured image, which is a captured image providing an origin of the first adjacent partial image, are overlapped in the first common region. The generation step provides to generate the concentration conversion table as the second conversion table for performing the correction to approximate a concentration characteristic of each target captured image in a second common region to a concentration characteristic of a second adjacent captured image in the second common region when the photographic subject region of the target captured image and a photographic subject region of the second adjacent captured image, which is a captured image providing an origin of the second adjacent partial image, are overlapped in the second common region. The mixture conversion step provides to convert the concentration of the target partial image to make an influence of the first conversion table larger as compared with an influence of the second conversion table as a position of a pixel in the target partial image is closer to the first adjacent partial image, and to make the influence of the second conversion table larger as compared with the influence of the first conversion table as the position of the pixel in the target partial image is closer to the second adjacent partial image.

In the above storage medium, a deviation in the concentration characteristic can be suppressed in all of the boundary portions in the composite image in which the multiple partial images are continuously arranged in the annular shape.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

Hereinafter, a description will be given of an embodiment of the present application with reference to the drawings.
[1. Configuration]

Figure 1:
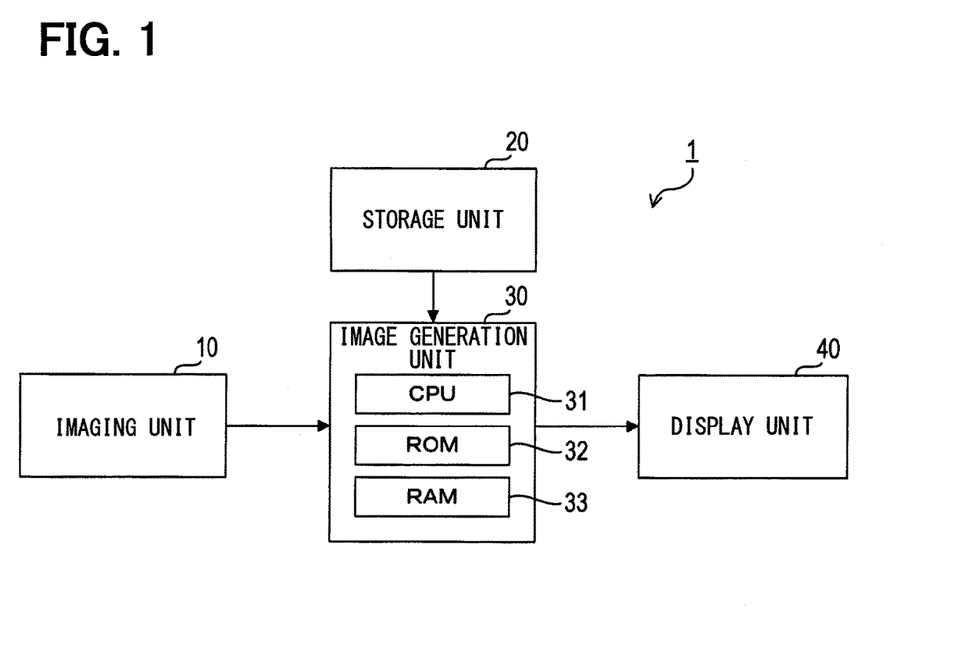
FIG. 1 is a block diagram illustrating a configuration of a top view image generating device.

A top view image generating device 1 illustrated in FIG. 1 is a device mounted in a vehicle 9 (refer to FIG. 2), which generates a top view image which is an image of the vehicle 9 viewed from a top (image overlooked from a sky), and displays the top view image for driver's visual recognition. The top view image generating device 1 according to this embodiment includes an imaging unit 10, a storage unit 20, an image generation unit 30, and a display unit 40.

The imaging unit 10 images surroundings of the vehicle 9. Specifically, the imaging unit 10 is equipped with four cameras 11, 12, 13, and 14 illustrated in FIG. 2. The first camera 11 is disposed in front of the vehicle 9, and images an imaging area 11A below (a ground surface of) a front region of the vehicle 9. The camera 12 is disposed on a left side (for example, a let door mirror) of the vehicle 9, and images an imaging area 12A below a left region of the vehicle 9. The camera 13 is disposed at the rear of the vehicle 9, and images an imaging area 13A below a rear region of the vehicle 9. The camera 14 is disposed on a right side (for example, a right door mirror) of the vehicle 9, and images an imaging area 14A below a right region of the vehicle 9.

Those four cameras 11, 12, 13, and 14 are wide-angle cameras that can take images at a view angle of 180 degrees, and an entire circumstance of the vehicle 9 is covered by the four imaging areas 11A, 12A, 13A, and 14A of those four cameras 11, 12, 13, and 14. Specifically, the respective imaging areas adjacent to each other in a circumferential direction of the vehicle 9 have portions (overlap regions) 112, 123, 134, and 141 in which the imaging areas overlap with each other as indicated by hatching in FIG. 2. In other words, in the four captured images by the four cameras 11, 12, 13, and 14, parts of subject regions (subjects) overlap with each other.

The storage unit 20 illustrated in FIG. 1 stores unique data (calibration data) of installation states of the four cameras 11, 12, 13, and 14 with respect to the vehicle 9. Specifically, the storage unit 20 has a storage device in which the calibration data is stored in advance.

The captured images by the four cameras 11, 12, 13, and 14 are combined (joined) as a series of images (top view image) which are continuously arranged in an annular shape so as to surround the vehicle 9 through a process to be described later. It is preferable that the boundary portions in which the respective images captured by the different cameras are adjacent to each other positionally conform to each other as precisely as possible in the combined image. Under the circumstances, in a stage before shipment of the vehicle 9, the four cameras 11, 12, 13, and 14 are calibrated for each vehicle 9, and calibration data corresponding to an individual difference (individual difference in the installation states of the cameras) of the vehicle 9 is stored in the storage unit 20. The calibration in this example is performed by actually imaging, for example, a road surface on which a predetermined pattern (pattern suitable for identifying the amount of deviation between the respective images in the composite image) is drawn by the four cameras 11, 12, 13, and 14. In other words, an image is actually captured to generate the top view image with the result that the amount of deviation of the respective images in the top view image is identified, and the calibration data is therefore set so that the amount of deviation approximates 0. In this embodiment, information on a coordinate position, a pitch angle, a yaw angle, and a roll angle in a three-dimensional space on the basis of a certain point in each of the four cameras 11, 12, 13, and 14 is stored in the storage unit 20 as the calibration data in advance.

The image generation unit 30 illustrated in FIG. 1 is formed of a microcomputer having a CPU 31, a ROM 32, and a RAM 33, and the CPU 31 as a processing entity (computer) executes a process based on a program recorded on a recording medium such as the ROM 32. Specifically, the image generation unit 30 performs a position correction based on the calibration data and a concentration correction (concentration conversion) of the image on the images captured by the four cameras 11, 12, 13, and 14 to generate the top view image.

The display unit 40 displays the top view image generated by the image generation unit 30 for an occupant (for example, a driver) of the vehicle. Specifically, the display unit 40 includes a display device (display) for displaying the image for the occupant of the vehicle.

[2. Processing]

Figure 3:
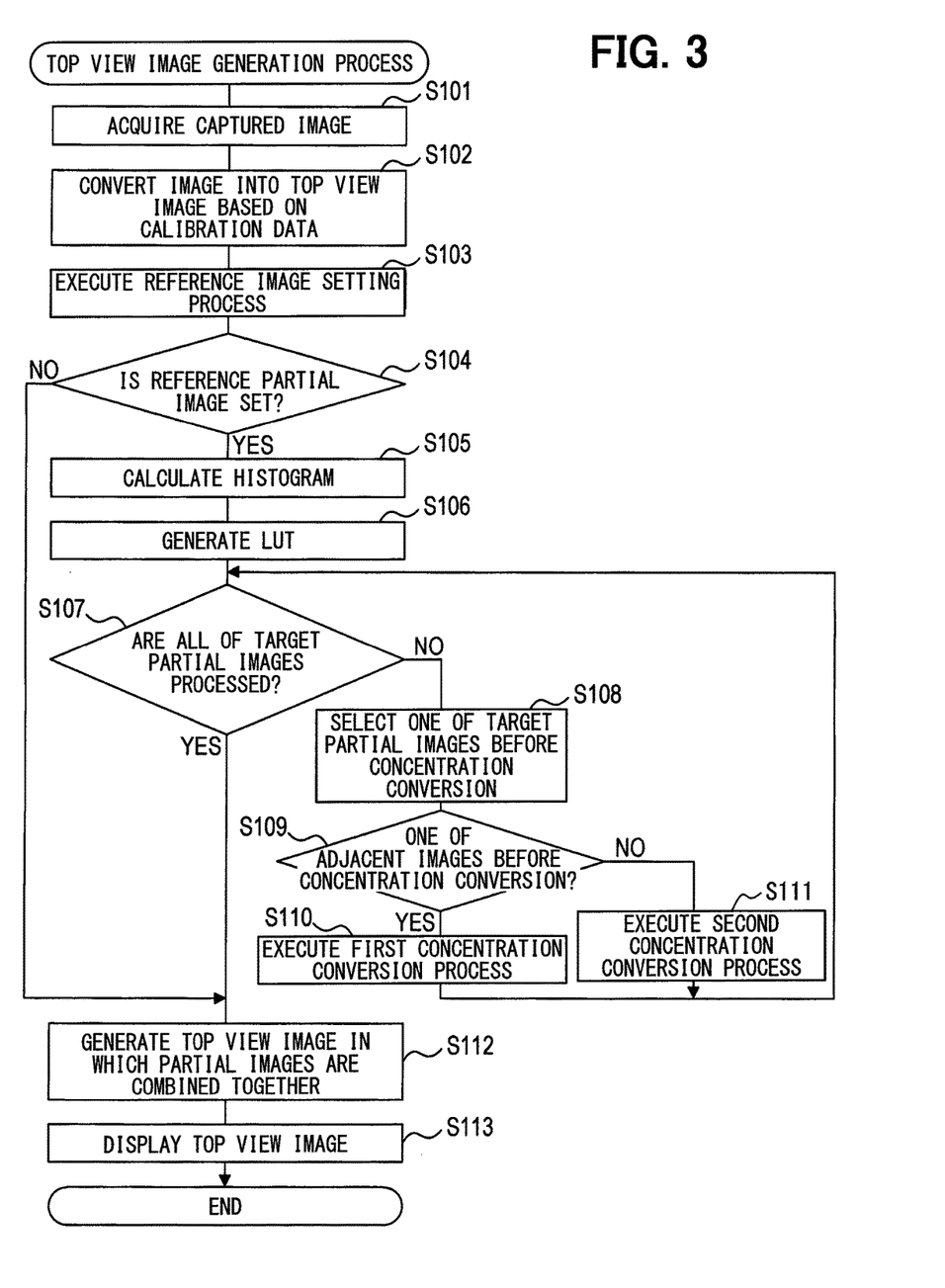
FIG. 3 is a flowchart of a top view image generation process.

A top view image generation process (top view image generation method) executed by the image generation unit 30 (specifically, CPU 31) according to the program will be described with reference to a flowchart of FIG. 3. The top view image generation process of FIG. 3 is periodically executed for each imaging period (for example, a short period during which images can be taken multiple times per second) of the four cameras 11, 12, 13, and 14.

First, the image generation unit 30 acquires the images captured by the four cameras 11, 12, 13, and 14 from the imaging unit 10 (S101). The imaging by the four cameras 11, 12, 13, and 14 is performed at the same time (in synchronization).

Subsequently, the image generation unit 30 converts the images captured by the respective cameras 11, 12, 13, and 14 into top view images (images as viewed from a top, and corrected in distortion caused by wide-angle imaging) on the basis of the calibration data (S102).

Figure 4A:
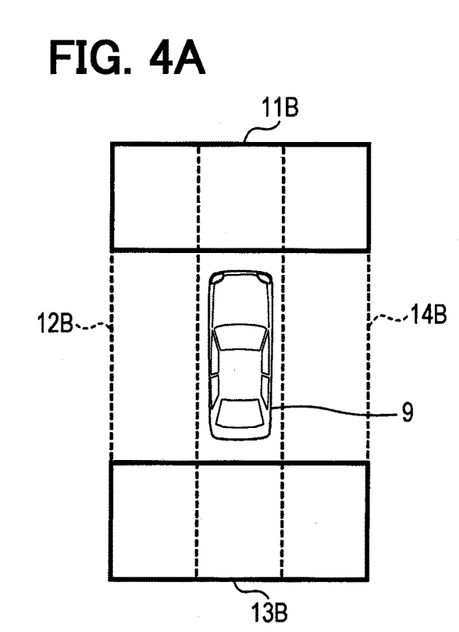
FIG. 4A and FIG. 4C are diagrams illustrating respective captured images converted into top view images.
Figure 4B:
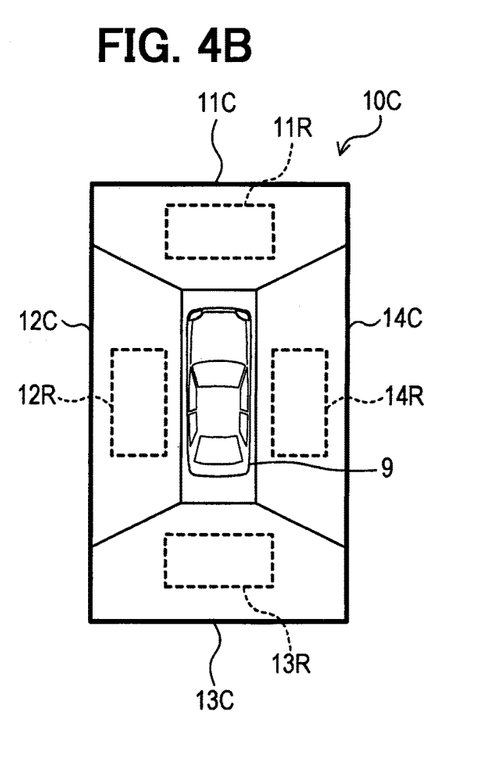
FIG. 4B is a diagram illustrating partial images configuring a top view image.
Figure 4C:
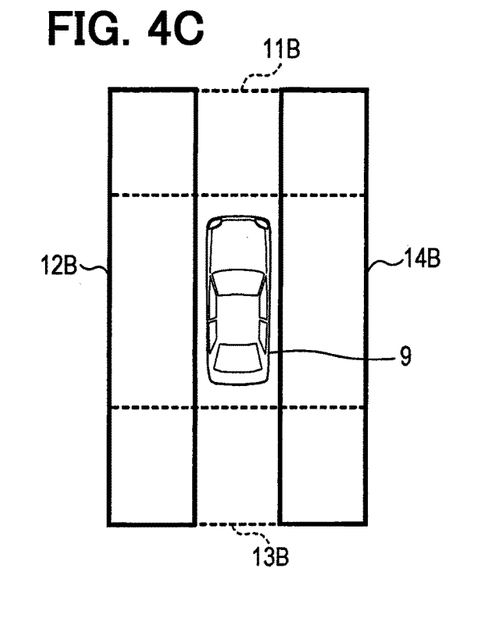

Specifically, as illustrated in FIG. 4A and FIG. 4C, the image generation unit 30 generates a first top view image 11B, a second top view image 12B, a third top view image 13B, and a fourth top view image 14B obtained by converting the images captured by the first camera 11, the second camera 12, the third camera 13, and the fourth camera 14 into the respective top views. In FIG. 4A and FIG. 4C, for clarifying the respective top view images 11B, 12B, 13B, and 14B, those images are divided into a pair of the first top view image 11B and the third top view image 13B, and a pair of the second top view image 12B and the fourth top view image 14B.

A left end of the first top view image 11B overlaps with a front end of the second top view image 12B, and a right end of the first top view image 11B overlaps with a front end of the fourth top view image 14B. A left end of the third top view image 13B overlaps with a lower end of the second top view image 12B, and a right end of the third top view image 13B overlaps with a lower end of the fourth top view image 14B.

As illustrated in FIG. 4B, a top view image 10C is configured in such a manner that four partial images 11C, 12C, 13C, and 14C around the vehicle 9 are continuously arranged in an annular shape without overlapping with each other. For that reason, the image generation unit 30 cuts out the four partial images 11C, 12C, 13C, and 14C that do not overlap with each other from the respective four top view images 11B, 12B, 13B, and 14B according to a shape of the top view image 10C illustrated in FIG. 4B.

Subsequently, the image generation unit 30 executes a reference image setting process for setting one of the four partial images 11C, 12C, 13C, and 14C, whose concentration characteristic satisfies a predetermined condition to a reference partial image (S103). The reference partial image is an image defining a reference of the concentration conversion to be described later in the four partial images 11C, 12C, 13C, and 14C, and not subjected to the concentration conversion.

Specifically, the image generation unit 30 selects a partial image largest in the number of pixels N with a concentration falling within a predetermined concentration range (a range from concentrations TH1 to TH2) from the four partial images 11C, 12C, 13C, and 14C. In this embodiment, as illustrated in FIG. 4B, analysis target regions 11R, 12R, 13R, and 14R are set at positions close to centers small in distortion in the respective partial images 11C, 12C, 13C, and 14C, and the concentration is determined on the basis of pixels included in those respective regions. The concentration range (concentrations TH1 to TH2) is set in the center of a range from an available minimum concentration to an available maximum concentration. In other words, the concentration range is set so that images having a concentration biased toward the minimum concentration side or the maximum concentration side are unlikely to be selected. The concentration can be translated into a pixel value, a gradation value, or a brightness.

When the number of pixels N in a selected image is equal to or larger than a predetermined threshold value, the image generation unit 30 sets the image as the reference partial image. In other words, one reference partial image is set at the maximum. In other words, when no partial image whose concentration characteristic satisfies the above-mentioned predetermined condition is present in the four partial images 11C, 12C, 13C, and 14C, the reference partial image is not set. In that case, as will be described later, the partial images 11C, 12C, 13C, and 14C are not corrected (concentration conversion process) (no in S104).

Subsequently, the image generation unit 30 determines whether the reference partial image is set, or not, in the reference image setting process of S103 (S104). If the image generation unit 30 determines that the reference partial image is set (yes in S104), the image generation unit 30 performs a process (S105 to S111) for converting the concentrations of the images (hereinafter referred to as "target partial images") other than the reference partial image in the partial images 11C, 12C, 13C, and 14C (S105 to S111).

Figure 2:
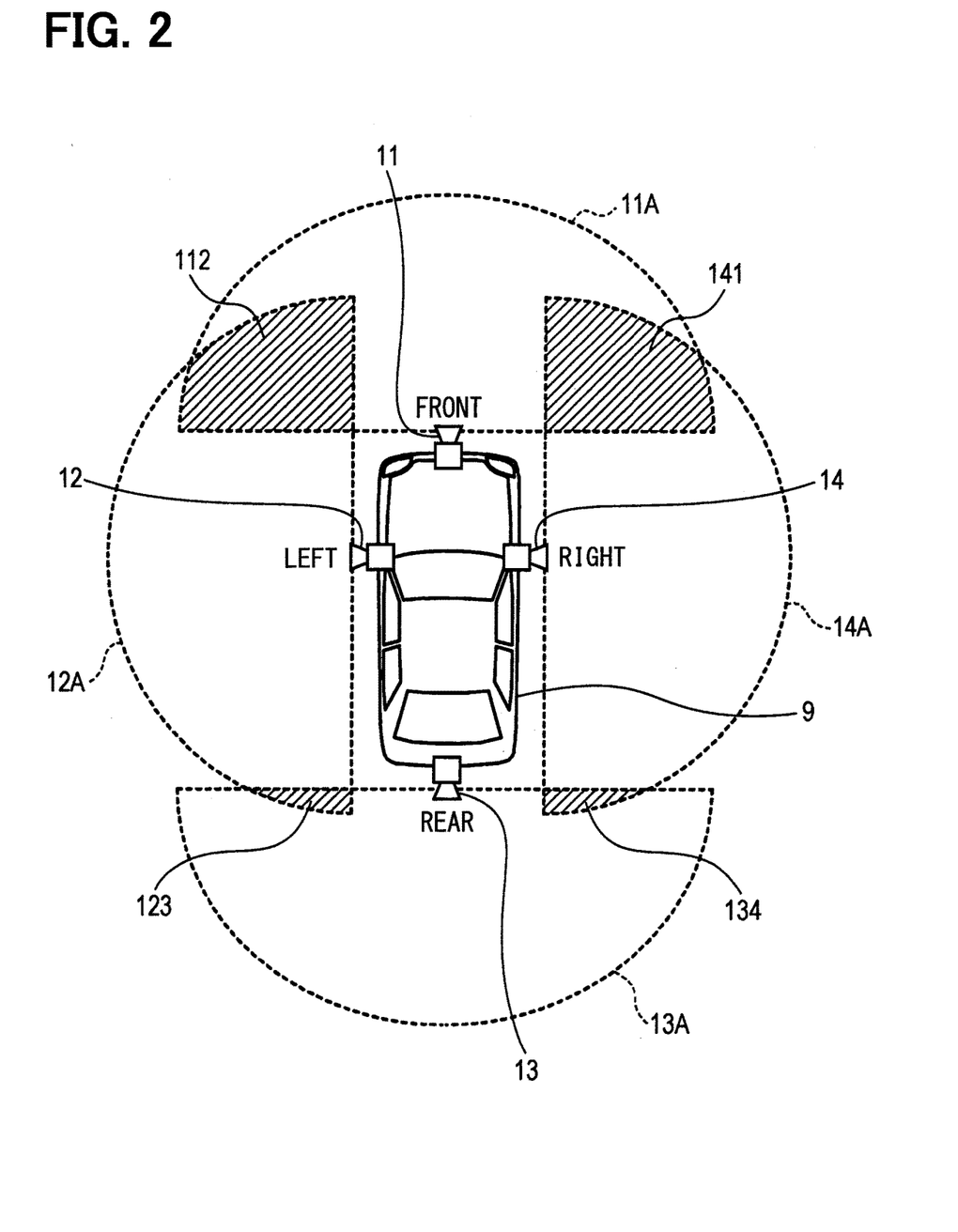
FIG. 2 is a diagram illustrating an imaging area of a camera installed in a vehicle.

In other words, the image generation unit 30 first identifies overlap images which are partial images (both ends in this example) of the images captured by the respective cameras 11, 12, 13, and 14, and forming the above-mentioned overlap regions 112, 123, 134, and 141 (FIG. 2). In this embodiment, overlap images are identified in the above-mentioned top view images 11B, 12B, 13B, and 14B. The image generation unit 30 generates a histogram representing a relationship between a concentration (pixel value) and a frequency (degree) as information indicative of the concentration characteristic for each of the overlap images (S105). Specifically, since two overlap images are present in each of the four overlap regions 112, 123, 134, and 141, eight overlap images are present, and eight histograms are generated.

Then, the image generation unit 30 generates a concentration conversion table for allowing a histogram A (concentration characteristic A) of one overlap image A to approximate a histogram B (concentration characteristic B) of the other overlap image B for each pair of two overlap images forming the same overlap region (S106). In the present specification, to allow the histogram B to approximate the histogram A is preferably performed by making the histogram B equal to the histogram A, but includes a case in which the histogram B is not perfectly equal to the histogram B. In the following description, the concentration conversion table (look-up table) is called "LUT". The LUT is generated for each of the four overlap regions 112, 123, 134, and 141. In other words, four LUTs are generated.

As an LUT generation method for allowing the histogram B to approximate the histogram A, various methods have been well known. In this embodiment, the LUT is generated in a procedure of the following [M1] to [M4].

[M1] A minimum concentration of the histogram A is set as a process target concentration A, and a minimum concentration of the histogram B is set as a process target concentration B.

Figure 5A:
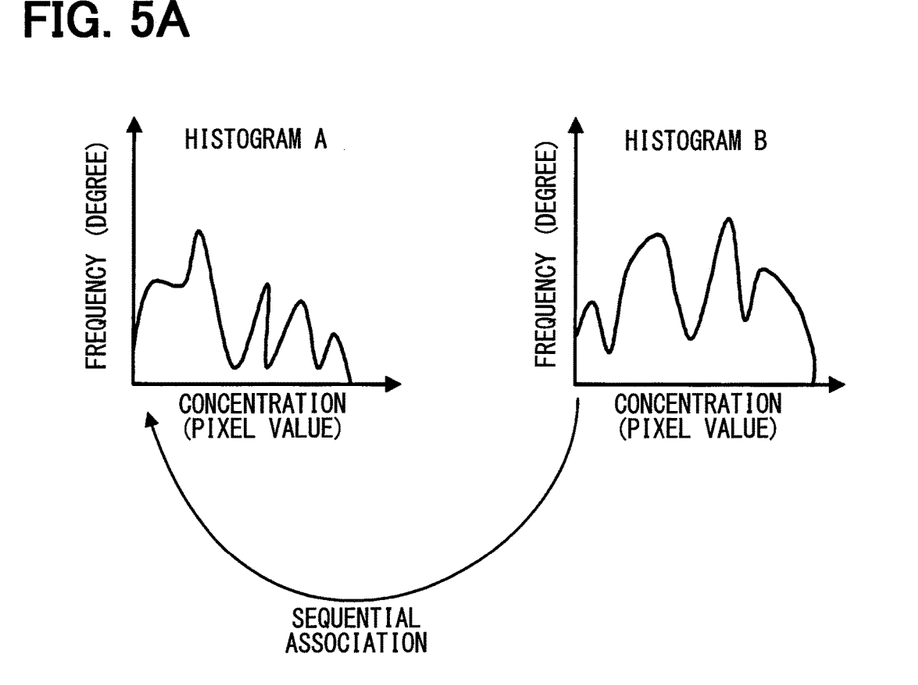
FIG. 5A is a diagram illustrating a procedure of associating a processing target concentration B with a processing target concentration A.

[M2] As illustrated in FIG. 5A, the process target concentration B is associated with the process target concentration A.

[M3] When the following Expression (1) is not satisfied, the process target concentration B is changed to a next highest concentration, and the process returns to the above [M2].

Frequency of process target concentration A≥total frequency of associated process target concentration B    Ex. (1)

[M4] When the above Expression (1) is satisfied, the process target concentration B associated with the present process target concentration A is decided, and the process target concentration A and the process target concentration B are changed to respective next highest concentrations. Therefore, the process returns to the above [M2].

Figure 5B:
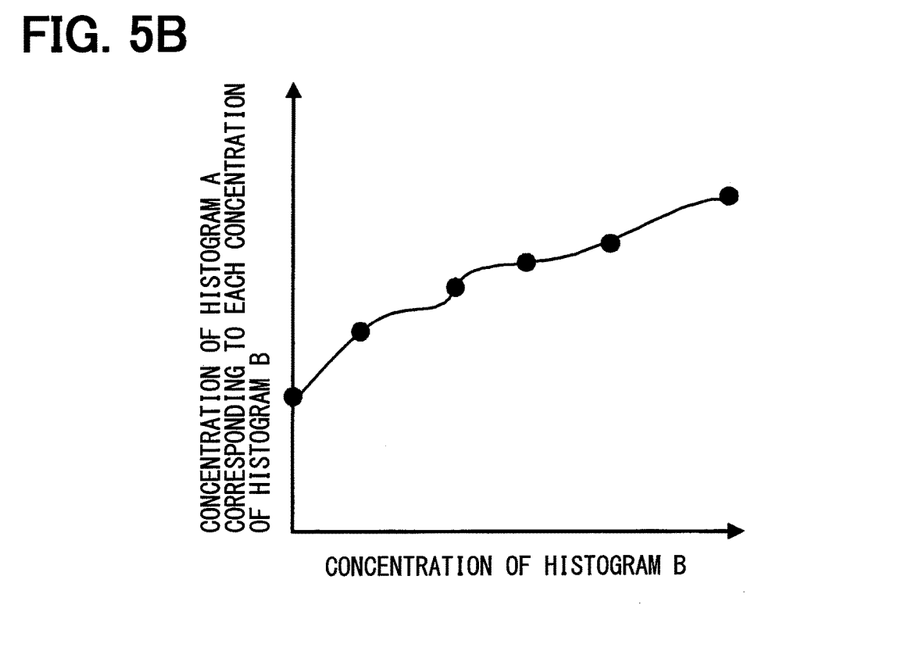
FIG. 5B is a diagram illustrating a procedure for generating an LUT.

With the repetition of the above procedure, a concentration of the histogram B corresponding to each concentration of the histogram A is determined. As illustrated in FIG. 5B, the concentrations of the histogram B are set as input concentrations, the concentrations of the histogram A corresponding to those concentrations of the histogram B are set as output concentrations, and the determined corresponding points are connected to each other to generate the LUT.

Returning to FIG. 3, the image generation unit 30 determines whether a concentration conversion process (S110 or S111) to be described later has been completed, or not, for all of the target partial images (S107). If the image generation unit 30 determines that the concentration conversion process has not been completed for all of the target partial images (one or more target partial images before concentration conversion exist) (no in S107), the image generation unit 30 selects one of the target partial images before the concentration conversion as an object to be processed (S108). The selected target partial image is called "image to be processed". An order of selecting the images to be processed is set according to a position of the reference partial image in advance. For example, an order of selecting the images in a circumferential direction (counterclockwise) in turn from the target partial image adjacent to the reference partial image in a counterclockwise direction is set in the top view image 10C. The order is an example, and not particularly restricted. The order is set in such a manner that the target partial images not adjacent to any one of the reference partial image and the target partial images subjected to the concentration conversion are not selected as the images to be processed.

Then, the image generation unit 30 determines whether one of two partial images (hereinafter referred to as "first adjacent partial image" and "second adjacent partial image") adjacent to both sides of the image to be processed in the top view image 10C is the image to be processed before the concentration conversion, or not (S109). If the image generation unit 30 determines that one of the first adjacent partial image and the second adjacent partial image is the image to be processed before the concentration conversion (yes in S109), the image generation unit 30 executes a first concentration conversion process (S110), and thereafter returns to S107. On the other hand, if the image generation unit 30 determines that both of the first adjacent partial image and the second adjacent partial image are not the images to be processed before the concentration conversion (any one of the reference partial image and the target partial image subjected to the concentration conversion) (no in S109), the image generation unit 30 executes a second concentration conversion process (S111), and thereafter returns to S107.

The first concentration conversion process and the second concentration conversion process will be described.

The first concentration conversion process is a process for converting the concentration of the images to be processed with the use of (on the basis of) the reference partial image or the target partial image (in this example, merely called "adjacent partial image") subjected to the concentration conversion which is one of the first adjacent partial image and the second adjacent partial image. Specifically, in the first concentration conversion process, the concentration of the image to be processed is uniformly converted with the use of the LUT (LUT for performing the concentration conversion process that allows the image to be processed to approximate the adjacent partial image) generated on the basis of the overlap region corresponding to a boundary between the image to be processed and the adjacent partial image. As a result, discontinuity (deviation of the concentration characteristic) of the concentration on a boundary surface between the image to be processed and the adjacent partial image is suppressed.

On the other hand, the second concentration conversion process is a process for converting the concentration of the image to be processed with the use of (on the basis of) both of the first adjacent partial image and the second adjacent partial image. Both of the first adjacent partial image and the second adjacent partial image are any one of the reference partial image and the image to be processed after the concentration conversion.

Figure 6A:
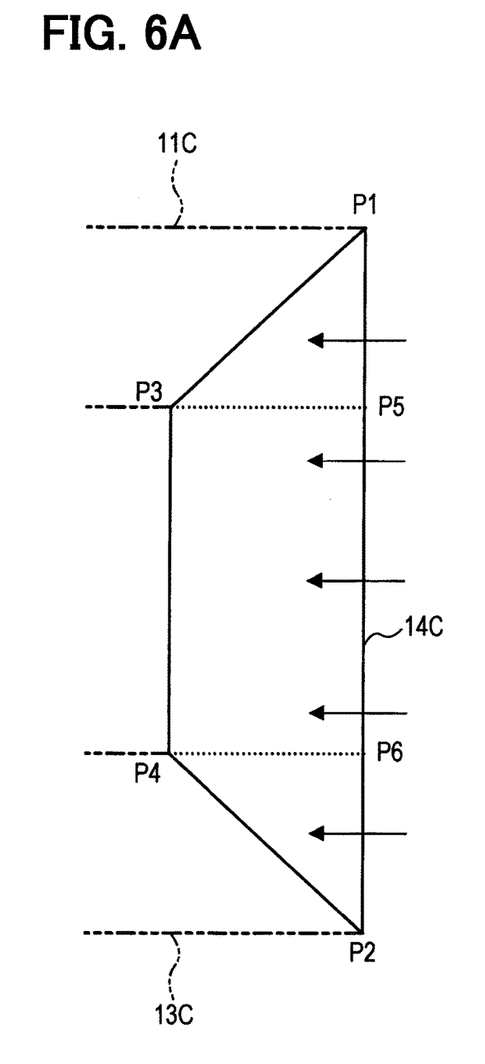
FIG. 6A to FIG. 6C are diagrams illustrating a second concentration conversion process.
Figure 6B:
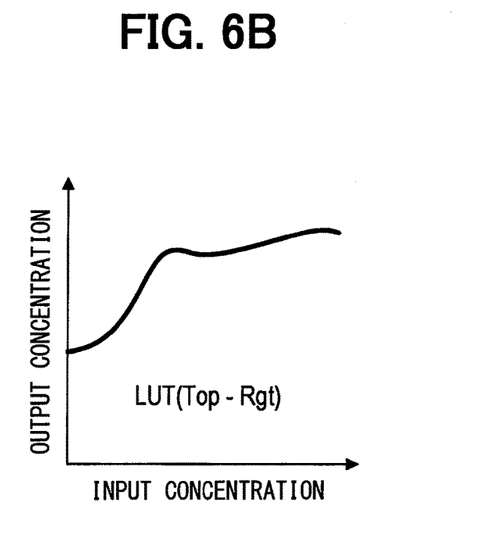
Figure 6C:
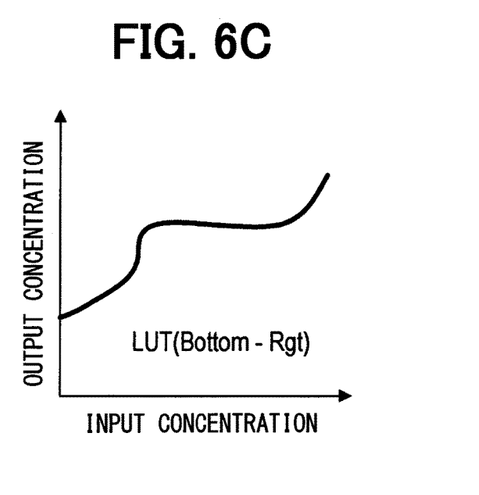

Specifically, for example, as illustrated in FIG. 6A to FIG. 6C, in the image to be processed 14C, the LUT used for the concentration conversion process is made different between the pixels close to the first adjacent partial image 11C and the pixels close to the second adjacent partial image 13C.

In this embodiment, the LUT generated on the basis of the overlap region corresponding to a boundary (line segment (P1, P3)) between the image to be processed 14C and the first adjacent partial image 11C is used for the pixels adjacent to the first adjacent partial image 11C in the pixels included in the image to be processed 14C. The LUT is configured to perform a connection that allows the concentration characteristic of the image to be processed 14C to approximate the concentration characteristic of the first adjacent partial image 11C, and is hereinafter referred to as "first LUT". In the present specification, the overlap region is a region (hereinafter referred to as "first common region") in which a subject region is common to the top view images (hereinafter referred to as "target captured image 14B" and "first adjacent captured image 11B") which are originals (cut source) of the image to be processed 14C and the first adjacent partial image 11C. In other words, the first LUT is configured to perform a correction that allows the concentration characteristic of the target captured image 14B in the first common region to approximate the concentration characteristic of the first adjacent captured image 11B in the first common region.

On the other hand, the LUT generated on the basis of the overlap region corresponding to a boundary (line segment (P2, P4)) between the image to be processed 14C and the second adjacent partial image 13C is used for the pixels adjacent to the second adjacent partial image 13C among the pixels included in the image to be processed 14C. The LUT is configured to perform a connection that allows the concentration characteristic of the image to be processed 14C to approximate the concentration characteristic of the second adjacent partial image 13C, and is hereinafter referred to as "second LUT". In the present specification, the overlap region is a region (hereinafter referred to as "second common region") in which a subject region is common to the top view images (hereinafter referred to as "second adjacent captured image 13B") which are originals (cut source) of the target captured image 14B and the second adjacent partial image 13C. In other words, the second LUT is configured to perform a correction that allows the concentration characteristic of the target captured image 14B in the second common region to approximate the concentration characteristic of the second adjacent captured image 13B in the second common region.

A composite LUT into which the first LUT and the second LUT are combined together is used for the remaining pixels configuring the image to be processed 14C. Specifically, the composite LUT for converting the concentration of the image to be processed 14C is set so that an influence of the first LUT becomes larger as compared with an influence of the second LUT, as a position of the pixel in the image to be processed 14C is closer to the first adjacent partial image 11C. In other words, the composite LUT for converting the concentration of the image to be processed 14C is set so that the influence of the second LUT becomes larger as compared with the influence of the first LUT, as the position of the pixel in the image to be processed 14C is closer to the second adjacent partial image 13C. In other words, the composite LUT is different according to the position of the pixel in the image to be processed 14C. For example, a composite LUT that averages the first LUT and the second LUT by an equal weight is used for the pixel located in the middle of the first adjacent partial image 11C and the second adjacent partial image 13C.

Figure 7:
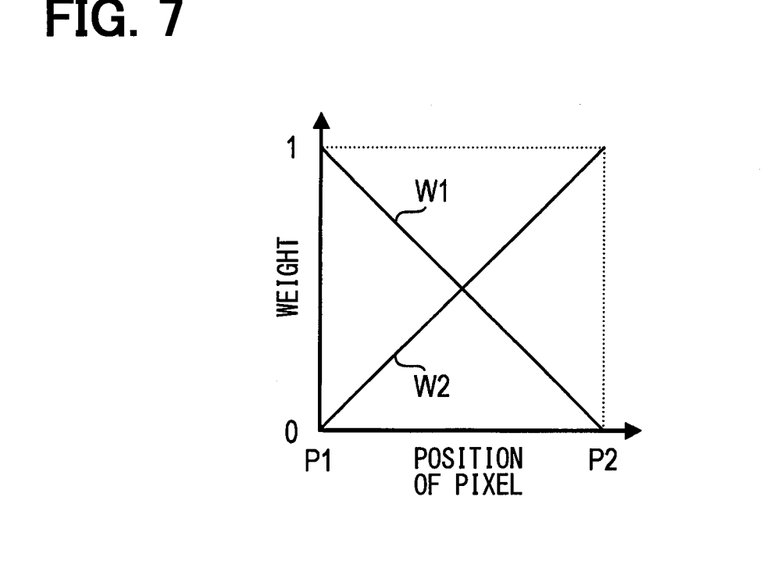
FIG. 7 is a graph illustrating a relationship between a position of a pixel and a weight of the LUT according to an embodiment.

Specifically, as illustrated in FIG. 7, for pixels on a line segment (P1, P2), a weight W1 of the first LUT and a weight W2 of the second LUT may be linearly changed according to a position (distance to points P1 and P2) on the line segment. For pixels other than the pixels on the line segment, which are included in a rectangular region having a line segment (P3, P4) as one side and a line segment (P5, P6) which is a part of the line segment (P1, P2) as an opposite side, the weight may be set so that all of the pixels on a straight line parallel to the line segment (P3, P5) have the same weight. For pixels included in the remaining two triangular regions (triangle (P1, P3, P5) and triangle (P2, P4, P6)), the weight may be set so that all of the pixels on a straight line passing through the point P3 or the point P4 have the same weight.

Returning to FIG. 3, if the image generation unit 30 determines that the concentration conversion process has been completed for all of the target partial images in S107 described above (yes in S107), the image generation unit 30 shifts the processing to S112. If the image generation unit 30 determines that the reference partial image has not been set in the above-mentioned S104 (no in S104), the image generation unit 30 skips a process (S105 to S111) for concentration conversion, and shifts the processing to S112.

In S112, the image generation unit 30 generates a top view image in which the four partial images 11C, 12C, 13C, and 14C (images subjected to the concentration conversion when the concentration conversion is performed) are continuously arranged in an annular shape. Further, the image generation unit 30 displays the generated top view image on the display unit 40 (S113), and thereafter completes the top view image generation process of FIG. 3.

[3. Advantages]

The embodiment described in detail above obtains the following advantages.

[3A] In the top view image generating device 1 according to this embodiment, the image generation unit 30 generates the first LUT for performing the correction that allows the concentration characteristic of the target partial image to approximate the concentration characteristic of the first adjacent partial image, and the second LUT for performing the correction that allows the concentration characteristic of the target partial image to approximate the concentration characteristic of the second adjacent partial image (S105 to S106). The image generation unit 30 converts the concentration of at least one target partial image with the use of both of the first LUT and the second LUT (S111). Specifically, the image generation unit 30 converts the concentration of the target partial image so that the influence of the first LUT becomes larger as compared with the influence of the second LUT, as the position of the pixel in the target partial image is closer to the first adjacent partial image. In other words, the image generation unit 30 converts the concentration of the target partial image so that the influence of the second LUT becomes larger as compared with the influence of the first LUT, as the position of the pixel in the target partial image is closer to the second adjacent partial image.

Therefore, according to this embodiment, a deviation in the concentration characteristic can be suppressed in all of the boundary portions in the composite image (top view image) in which the multiple partial images are continuously arranged in the annular shape. In particular, because the image per se is subjected to digital correction, high-precision adjustment can be performed as compared with a configuration in which, for example, gains of the cameras are subjected to analog correction.

[3B] The image generation unit 30 sets one of the multiple partial images 11C, 12C, 13C, and 14C, whose concentration characteristic satisfies a predetermined condition to the reference partial image (S103). Therefore, according to this embodiment, as compared with a case in which the reference partial image is fixed (predetermined), the partial images 11C, 12C, 13C, and 14C can be appropriately corrected. In other words, the partial images to be the reference partial image may be different according to environments around the vehicle (how light is applied to the vehicle surroundings such as daytime and night, or the presence or absence of an oncoming vehicle). For that reason, when the reference partial image is fixed, even the partial image (for example, too dark image or too bright image in overall) improper as the reference partial image is used as the reference partial image. On the contrary, in this embodiment, because the image whose concentration characteristic satisfies the predetermined condition is set to the reference partial image, the partial image suitable for the reference partial image can be selected from the multiple partial images 11C, 12C, 13C, and 14C.

[3C] If no partial image that satisfies the predetermined condition for setting of the reference partial image is present in the multiple partial images 11C, 12C, 13C, and 14C, the image generation unit 30 does not correct the partial images 11C, 12C, 13C, and 14C (S104). Therefore, according to this embodiment, the improper composite image can be restrained from being generated by performing a correction despite the absence of the proper partial image as the reference partial image in the multiple partial images 11C, 12C, 13C, and 14C.

[3D] If the first adjacent partial image and the second adjacent partial image are the reference partial image or the target partial image subjected to the concentration conversion, and the target partial image before the concentration conversion, the image generation unit 30 converts the concentration of the target partial image with the use of one of the first LUT and the second LUT (S110). On the other hand, if both of the first adjacent partial image and the second adjacent partial image are any one of the reference partial image and the target partial image subjected to the concentration conversion, the image generation unit 30 converts the concentration of the target partial image with the use of both of the first LUT and the second LUT (S111). Therefore, according to this embodiment, the conversion of the concentration of the target partial image with the use of both of the first LUT and the second LUT can be performed on the minimum target partial images, and a processing load can be suppressed.

[3E] The image generation unit 30 generates the top view image 10C which is an image of the surroundings of the vehicle 9 viewed from a top with the use of the multiple captured images obtained by imaging the surroundings of the vehicle 9 by the multiple cameras 11, 12, 13, and 14 mounted in the vehicle 9. Therefore, according to this embodiment, a more natural top view image can be provided to the driver.

In this embodiment, the image generation unit 30 corresponds to an example of an image generating device, and S103 to S111 correspond to an example of the processing as correction device and a correction step. S103 corresponds to an example of the processing as setting device, and S105 to S106 correspond to an example of the processing as generation device and a generation step. S110 corresponds to an example of the processing as the fixation conversion device, and S111 corresponds to an example of the processing as mixture conversion device and a mixture conversion step. The cameras 11, 12, 13, and 14 correspond to an example of an imaging device, the top view image 10C corresponds to an example of a composite image, the first LUT corresponds to an example of a first conversion table, and the second LUT corresponds to an example of a second conversion table.

[4. Other Embodiments]

Although the embodiment of the present application was described above, it is needless to state that the present application is not limited to the aforementioned embodiment and that various configurations can be employed.

[4A] The LUT generation method is not limited to the method exemplified in the above embodiment, but may employ other known methods. For example, as disclosed in the above PTL 1, an LUT that can execute a histogram equalization may be generated, and the same correction process may be performed for the histogram.

[4B] The concentration conversion method using the composite LUT is not limited to the method exemplified in the above embodiment. For example, for all of the pixels included in the image to be processed 14C illustrated in FIG. 7, the weight may be set so that all of the pixels on a straight line parallel to the segment (P3, P5) have the same weight on the basis of the pixels on the segment line (P1, P2). In other words, the weight setting method for the pixels included in the two triangular regions (triangle (P1, P3, P5) and triangle (P2, P4, P6)) is different from the above embodiment. In the image to be processed 14C, both ends of the straight line may be replaced with P1 and P2 in FIG. 7 for each straight line parallel to the line segment (P1, P2), and the weight may be set for the pixels on the straight line.

Figure 8:
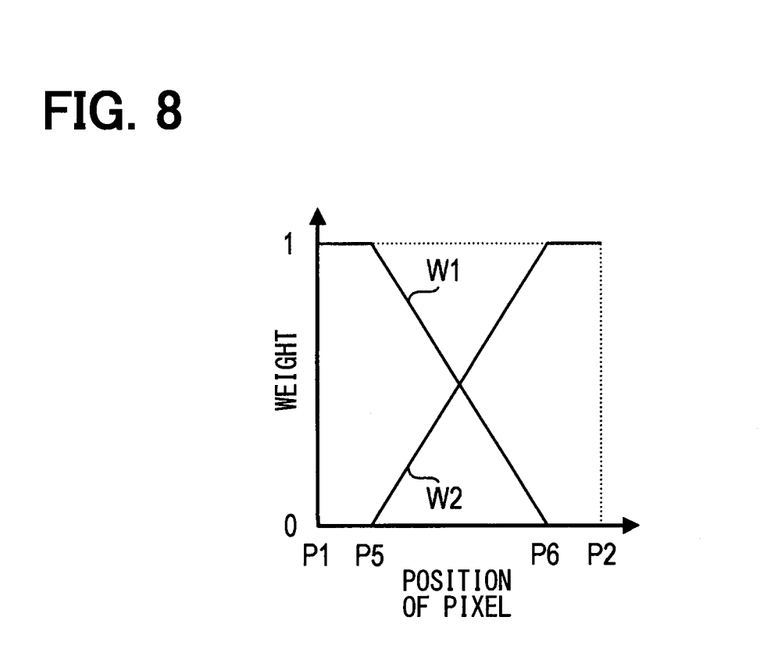
FIG. 8 is a graph illustrating a relationship between a position of a pixel and a weight of an LUT in a modification.

As illustrated in FIG. 8, for the pixels on the line segment (P5, P6), the weight W1 of the first LUT and the weight W2 of the second LUT may be linearly changed according to a position (distance to points P5 and P6) on the line segment. For pixels included in a rectangular region (P3, P4, P6, P5), the weight may be set so that all of the pixels on a straight line parallel to the line segment (P3, P5) have the same weight. For the pixels included in the remaining two triangular regions (triangle (P1, P3, P5) and triangle (P2, P4, P6)), the weight may be set so that weight becomes maximum.

The image to be processed 14C may be divided into multiple regions, and a weight may be set for each of the regions.

[4C] The timing for setting the reference partial image (timing at which the reference partial image can be changed) is not limited to each imaging period, but the reference partial image may be restrained from being frequently changed. For example, the reference partial image may be fixed in a predetermined period. For example, when the reference partial image is changed, a condition severer than a condition under which the same reference partial image is selected may be set so that the reference partial image at the present time does not satisfy a reference thereafter selected as the reference partial image continuously for a predetermined period. That the reference partial image is the same means that an arrangement in the top view image 10C is the same, and that the reference partial image is changed means that the partial image different in the arrangement in the top view image 10C is selected as the reference partial image.

[4D] In the above embodiment, the analysis target regions 11R, 12R, 13R, and 14R set in the respective partial images 11C, 12C, 13C, and 14C are set, and the determination is performed on the basis of the pixels included in those respective regions (S103), but the present application is not limited to this configuration. For example, the determination may be performed on the basis of all of the pixels included in the partial images 11C, 12C, 13C, and 14C.

[4E] In the above embodiment, one reference partial image is set at the maximum (S103), but the present application is not limited to this configuration, and multiple reference partial images may be set. For example, in S103 described above, an image largest in the number of pixels N and an image second largest in the number of pixels N may be selected as the reference partial images.

[4F] When the reference partial image is not set (when the concentration conversion process is not performed), this fact (or the reason) may be notified the driver of.

[4G] In the above embodiment, the reference partial image may not be set (S103). However, the present application is not limited to this configuration, and one or more reference partial images may be always set, and the concentration conversion process may be performed on the basis of the set reference partial image.

[4H] In the above embodiment, the reference partial image can be changed, but the present application is not limited to this configuration, and the partial image at a predetermined position in the top view image 10C may be always set as the reference partial image.

[4I] The positions and the number of cameras are not limited to those exemplified in the above embodiment. Also, the present application is also applicable to a composite image other than the top view image.

[4J] A function of one constituent element in the above-described embodiments may be distributed to a plurality of constituent elements, or functions of a plurality of constituent elements may be integrated into one constituent element. In addition, at least a part of the configuration in the embodiment may be replaced with a known configuration with the same function. In addition, a part of the configurations of the above-described embodiments may be omitted as long as the problem can be solved. In addition, at least a part of the configurations of the above-described embodiments may be added to or substituted with the configurations of the other embodiments. In addition, all aspects that are included in the technical spirit that is specified in the attached claims are embodiments of the present application.

[4K] The present application can be realized by various configurations such as a recording medium that records an image generation program or a system having the image generating device as a component in addition to the image generating device, the image generating method, and the image generation program.

It is noted that a flowchart or the processing of the flowchart in the present application includes sections (also referred to as steps), each of which is represented, for instance, as S100. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

The invention claimed is:

1. An image generating device that generates a composite image, in which a plurality of partial images respectively cut out from a plurality of captured images are continuously arranged, using the plurality of captured images respectively having photographic subject regions partially overlapping with each other, the image generating device comprising:
a correction device, using a processor, that corrects each target partial image by setting at least one of a first adjacent partial image and a second adjacent partial image, which are the partial images adjacent to the target partial image on both sides in the composite image, as a reference partial image, when at least one of the plurality of partial images is defined as a reference partial image, and the partial images other than the reference partial image are defined as target partial images, wherein the plurality of partial images are continuously arranged in an annular shape;
a generation device, using the processor, that generates a first conversion table as a concentration conversion table for performing a correction to approximate a concentration characteristic of each target partial image to a concentration characteristic of the first adjacent partial image and a second conversion table as a concentration conversion table for performing a correction to approximate the concentration characteristic of each target partial image to a concentration characteristic of the second adjacent partial image; and
a mixture conversion device, using the processor, that converts a concentration of each target partial image using each of the first conversion table and the second conversion table, wherein:
the generation device generates the concentration conversion table as the first conversion table for performing the correction to approximate a concentration characteristic of each target captured image in a first common region to a concentration characteristic of a first adjacent captured image in the first common region when a photographic subject region of the target captured image, which is a captured image providing an origin of the target partial image, and a photographic subject region of the first adjacent captured image, which is a captured image providing an origin of the first adjacent partial image, are overlapped in the first common region;
the generation device generates the concentration conversion table as the second conversion table for performing the correction to approximate a concentration characteristic of each target captured image in a second common region to a concentration characteristic of a second adjacent captured image in the second common region when the photographic subject region of the target captured image and a photographic subject region of the second adjacent captured image, which is a captured image providing an origin of the second adjacent partial image, are overlapped in the second common region; and
the mixture conversion device converts the concentration of the target partial image to make an influence of the first conversion table larger as compared with an influence of the second conversion table as a position of a pixel in the target partial image is closer to the first adjacent partial image, and to make the influence of the second conversion table larger as compared with the influence of the first conversion table as the position of the pixel in the target partial image is closer to the second adjacent partial image.

2. The image generating device according to claim 1, further comprising:
a setting device, using the processor, that sets one or more of the plurality of partial images, of which the concentration characteristic satisfies a predetermine condition, to be the reference partial image.

3. The image generating device according to claim 2, wherein:
the correction device does not correct the partial image when no partial image for satisfying the predetermined condition is present in the plurality of the partial images.

4. The image generating device according to claim 1, further comprising:
a fixation conversion device, using the processor, that converts a concentration of the target partial image using one of the first conversion table and the second conversion table, wherein:
the correction device converts the concentration of the target partial image using the fixation conversion device when the first adjacent partial image and the second adjacent partial image are one of the reference partial image and the target partial image after a concentration conversion, and the target partial image before the concentration conversion; and the correction device converts the concentration of the target partial image using the mixture conversion device when both of the first adjacent partial image and the second adjacent partial image are any one of the reference partial image and the target partial image after the concentration conversion.

5. The image generating device according to claim 1, wherein:
the plurality of captured images are captured by a plurality of imaging devices mounted in a vehicle, respectively; and
the composite image is an image of a surrounding of the vehicle viewed from a top.

6. An image generating method used in an image generating device that generates a composite image, in which a plurality of partial images respectively cut out from a plurality of captured images are continuously arranged, using the plurality of captured images respectively having photographic subject regions partially overlapping with each other, the image generating method comprising:
correcting each target partial image by setting at least one of a first adjacent partial image and a second adjacent partial image, which are the partial images adjacent to the target partial image on both sides in the composite image, as a reference partial image, when at least one of the plurality of partial images is defined as a reference partial image, and the partial images other than the reference partial image are defined as target partial images, wherein the plurality of partial images are continuously arranged in an annular shape;
generating a first conversion table as a concentration conversion table for performing a correction to approximate a concentration characteristic of each target partial image to a concentration characteristic of the first adjacent partial image and a second conversion table as a concentration conversion table for performing a correction to approximate the concentration characteristic of each target partial image to a concentration characteristic of the second adjacent partial image; and
converting a concentration of each target partial image using each of the first conversion table and the second conversion table, wherein:
the generating provides to generate the concentration conversion table as the first conversion table for performing the correction to approximate a concentration characteristic of each target captured image in a first common region to a concentration characteristic of a first adjacent captured image in the first common region when a photographic subject region of the target captured image, which is a captured image providing an origin of the target partial image, and a photographic subject region of the first adjacent captured image, which is a captured image providing an origin of the first adjacent partial image, are overlapped in the first common region;
the generating provides to generate the concentration conversion table as the second conversion table for performing the correction to approximate a concentration characteristic of each target captured image in a second common region to a concentration characteristic of a second adjacent captured image in the second common region when the photographic subject region of the target captured image and a photographic subject region of the second adjacent captured image, which is a captured image providing an origin of the second adjacent partial image, are overlapped in the second common region; and the converting provides to convert the concentration of the target partial image to make an influence of the first conversion table larger as compared with an influence of the second conversion table as a position of a pixel in the target partial image is closer to the first adjacent partial image, and to make the influence of the second conversion table larger as compared with the influence of the first conversion table as the position of the pixel in the target partial image is closer to the second adjacent partial image.

7. A non-transitory computer readable storage medium comprising instructions for functioning a computer as an image generating device that generates a composite image, in which a plurality of partial images respectively cut out from a plurality of captured images are continuously arranged, using the plurality of captured images respectively having photographic subject regions partially overlapping with each other, the instruction including:
correcting each target partial image by setting at least one of a first adjacent partial image and a second adjacent partial image, which are the partial images adjacent to the target partial image on both sides in the composite image, as a reference partial image, when at least one of the plurality of partial images is defined as a reference partial image, and the partial images other than the reference partial image are defined as target partial images, wherein the plurality of partial images are continuously arranged in an annular shape;
generating a first conversion table as a concentration conversion table for performing a correction to approximate a concentration characteristic of each target partial image to a concentration characteristic of the first adjacent partial image and a second conversion table as a concentration conversion table for performing a correction to approximate the concentration characteristic of each target partial image to a concentration characteristic of the second adjacent partial image; and
converting a concentration of each target partial image using each of the first conversion table and the second conversion table, wherein:
the generating provides to generate the concentration conversion table as the first conversion table for performing the correction to approximate a concentration characteristic of each target captured image in a first common region to a concentration characteristic of a first adjacent captured image in the first common region when a photographic subject region of the target captured image, which is a captured image providing an origin of the target partial image, and a photographic subject region of the first adjacent captured image, which is a captured image providing an origin of the first adjacent partial image, are overlapped in the first common region;
the generating provides to generate the concentration conversion table as the second conversion table for performing the correction to approximate a concentration characteristic of each target captured image in a second common region to a concentration characteristic of a second adjacent captured image in the second common region when the photographic subject region of the target captured image and a photographic subject region of the second adjacent captured image, which is a captured image providing an origin of the second adjacent partial image, are overlapped in the second common region; and
the converting provides to convert the concentration of the target partial image to make an influence of the first conversion table larger as compared with an influence of the second conversion table as a position of a pixel in the target partial image is closer to the first adjacent partial image, and to make the influence of the second conversion table larger as compared with the influence of the first conversion table as the position of the pixel in the target partial image is closer to the second adjacent partial image.

* * * * *